US012737329B2

(12) United States Patent
Du et al.

(10) Patent No.: US 12,737,329 B2
(45) Date of Patent: Sep. 15, 2026

(54) SCALABLE DESIGN OF RELATIONAL DATABASE FOR RESOURCE MANAGEMENT

(71) Applicant: Zoom Video Communications, Inc., San Jose, CA (US)

(72) Inventors: Yuanyuan Du, Hangzhou (CN); Jingjin Xie, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/782,704

(22) Filed: Jul. 24, 2024

(65) Prior Publication Data

US 2026/0030222 A1 Jan. 29, 2026

(51) Int. Cl.

*G06F 16/21* (2019.01)
*G06F 11/34* (2006.01)
*G06F 16/22* (2019.01)
*G06F 16/25* (2019.01)

(52) U.S. Cl.

CPC ........ *G06F 16/213* (2019.01); *G06F 11/3409* (2013.01); *G06F 16/2282* (2019.01); *G06F 16/256* (2019.01)

(58) Field of Classification Search

CPC ...................................................... G06F 16/213
USPC .......................................................... 707/803
See application file for complete search history.

(56) References Cited

U.S. PATENT DOCUMENTS

| | | | | |
|---|---|---|---|---|
| 6,513,041 | B2 | 1/2003 | Tarin | |
| 11,262,728 | B2 | 3/2022 | Zhang et al. | |
| 12,032,634 | B1 * | 7/2024 | Chen | G06F 16/9024 |
| 2012/0166277 | A1 * | 6/2012 | Gnanamani | G06Q 30/0251 707/706 |
| 2015/0220327 | A1 | 8/2015 | Poon et al. | |
| 2017/0337210 | A1 * | 11/2017 | Boehme | G06F 16/221 |
| 2021/0034598 | A1 | 2/2021 | Arye et al. | |
| 2022/0027335 | A1 * | 1/2022 | Bo | G06F 16/2282 |
| 2022/0269656 | A1 | 8/2022 | Verma | |
| 2024/0289993 | A1 * | 8/2024 | Liang | G06T 9/004 |
| 2025/0021231 | A1 * | 1/2025 | Gangadhar | G06F 3/0611 |

OTHER PUBLICATIONS

Invitation to Pay Additional Fees for PCT/US2025/036752 mailed Nov. 7, 2025.

(Continued)

*Primary Examiner* — Muluemebet Gurmu
(74) *Attorney, Agent, or Firm* — Kilpatrick Townsend & Stockton LLP

(57) ABSTRACT

Systems and methods for resource management using a scalable resource management database are provided. A resource management tool accesses a resource management database. The resource management tool determines a size of an attribute value corresponding to an attribute of a resource instance satisfies a predetermined size threshold. The resource management tool determines a query frequency associated with the attribute value satisfies a predetermined frequency threshold. The resource management tool creates a value index table based on a value table, the value index table excluding the attribute value satisfying the predetermined size threshold and the predetermined frequency threshold.

20 Claims, 14 Drawing Sheets

(56) References Cited

OTHER PUBLICATIONS

JovanPop, "Designing Product Catalogs in SQL Server Blog using JSON", https://techcommunity.microsoft.com/blog/sqlserver/designing-product-catalogs-in-sql-server-using-json/384594, Mar. 23, 2019; pp. 1-5.
Anonymous, "Entity-attribute-value model—Wikipedia", https://en.wikipedia.org/w/index.php?title=Entity-attribute-value_ model&oldid=623968433, Sep. 3, 2014; pp. 1-17.
Lesigang, "Read any JSON into list of key-value pairs (EAV format) in SQL Server", https://stackoverflow.com/questions/61800927/read-any-Json-into-list-of-key-value-pairs-eav-format-in-sql-server, Jun. 20, 2020; pp. 1-7.
Final Office Action for U.S. Appl. No. 18/782,704 mailed Nov. 7, 2025.
U.S. Appl. No. 18/782,582 , Final Office Action, Mailed on Jan. 15, 2026, 18 pages.
Application No. PCT/US2025/036752 , International Search Report and Written Opinion, Mailed on Jan. 8, 2026, 17 pages.

* cited by examiner

405

| name | addresses | owner |
|---|---|---|
| order | [{"address type":"internal", "address":"jdbc:*mysql*://localhost:3306/order"}, {"address type":"external", "address":"jdbc:*mysql*://100.10.10.10:3306/order"}] | James |
| user | [{"type":"internal", "address":"jdbc:*mysql*://localhost:3306/order"}, {"type":"external", "address":"jdbc:*mysql*://100.10.10.10:3306/order"}] | Allen |

410

| Resource Type ID 412 | Resource Type Name 414 |
|---|---|
| 1 | mysql |
| 2 | oracle |

420

| Instance ID 422 | Resource Type 424 |
|---|---|
| 1 | mysql |
| 2 | mysql |

430

| Attribute ID 432 | Resource Type 434 | Attribute Name 436 |
|---|---|---|
| 1 | 1 | name |
| 2 | 1 | address_type |
| 3 | 1 | address |
| 4 | 1 | owner |

440

| Value ID 442 | Instance ID 444 | Resource Type 446 | Attribute Name 448 | Value 450 | Group ID 452 |
|---|---|---|---|---|---|
| 1 | 1 | mysql | name | order | |
| 2 | 1 | mysql | address_type | internal | 1 |
| 3 | 1 | mysql | address | jdbc:*mysql*://localhost:3306/order | 1 |
| 4 | 1 | mysql | address_type | external | 2 |
| 5 | 1 | mysql | address | jdbc:*mysql*://100.10.10.10:3306/order | 2 |
| 6 | 1 | mysql | owner | James | |
| 7 | 1 | mysql | name | user | |
| 8 | 1 | mysql | address_type | internal | 1 |
| 9 | 2 | mysql | address | jdbc:*mysql*://localhost:3306/user | 1 |
| 10 | 2 | mysql | address_type | external | 2 |
| 11 | 2 | mysql | address | jdbc:*mysql*://100.10.10.10:3306/user | 2 |
| 12 | 2 | mysql | owner | Allen | |

*FIG. 4*

Figure 5A:
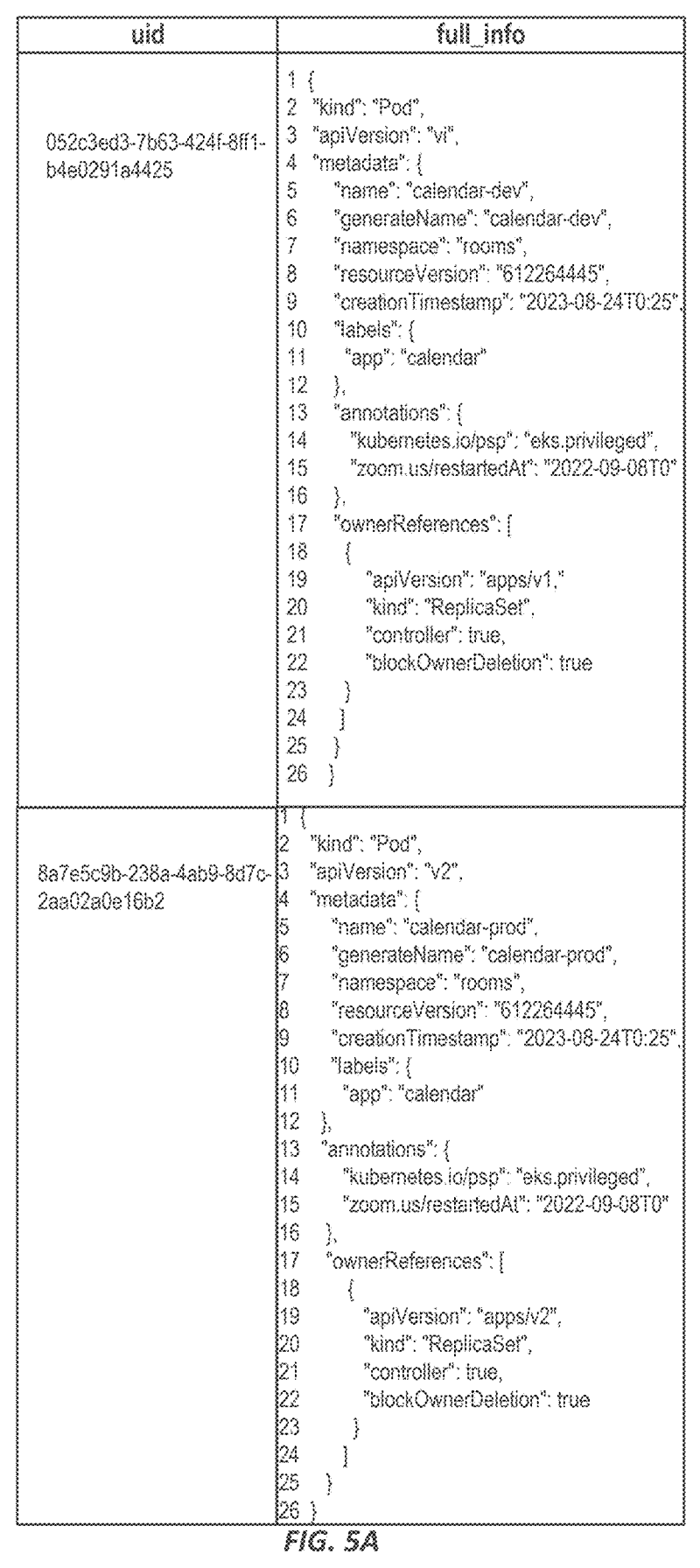

| uid | full_info |
|---|---|
| 052c3ed3-7b63-424f-8ff1-b4e0291a4425 | { <br> "kind": "Pod", <br> "apiVersion": "vi", <br> "metadata": { <br> "name": "calendar-dev", <br> "generateName": "calendar-dev", <br> "namespace": "rooms", <br> "resourceVersion": "612264445", <br> "creationTimestamp": "2023-08-24T0:25", <br> "labels": { <br> "app": "calendar" <br> }, <br> "annotations": { <br> "kubernetes.io/psp": "eks.privileged", <br> "zoom.us/restartedAt": "2022-09-08T0" <br> }, <br> "ownerReferences": [ <br> { <br> "apiVersion": "apps/v1," <br> "kind": "ReplicaSet", <br> "controller": true, <br> "blockOwnerDeletion": true <br> } <br> ] <br> } <br> } |
| 8a7e5c9b-238a-4ab9-8d7c-2aa02a0e16b2 | { <br> "kind": "Pod", <br> "apiVersion": "v2", <br> "metadata": { <br> "name": "calendar-prod", <br> "generateName": "calendar-prod", <br> "namespace": "rooms", <br> "resourceVersion": "612264445", <br> "creationTimestamp": "2023-08-24T0:25", <br> "labels": { <br> "app": "calendar" <br> }, <br> "annotations": { <br> "kubernetes.io/psp": "eks.privileged", <br> "zoom.us/restartedAt": "2022-09-08T0" <br> }, <br> "ownerReferences": [ <br> { <br> "apiVersion": "apps/v2", <br> "kind": "ReplicaSet", <br> "controller": true, <br> "blockOwnerDeletion": true <br> } <br> ] <br> } <br> } |

| Resource Type ID 512 | Resource Type Name 514 |
|---|---|
| 1 | pod |
| 2 | node |

520

| Instance ID 522 | Resource Type 524 |
|---|---|
| 1 | pod |
| 2 | pod |

530

| Attribute ID 532 | Resource Type 534 | Attribute Name 536 |
|---|---|---|
| 1 | 1 | uid |
| 2 | 1 | full_info |

*FIG. 5B*

| Value ID 542 | Instance ID 544 | Resource Type 546 | Attribute Name 548 | Value 550 |
|---|---|---|---|---|
| 1 | 1 | pod | uid | 052c3ed3-7b63-424f-8ff1-b4e0291a4425 |
| 2 | 1 | pod | full_info | {<br>"kind": "Pod",<br>"apiVersion": "vi",<br>"metadata": {<br>"name": "calendar-dev",<br>"generateName": "calendar-dev",<br>"namespace": "rooms",<br>"resourceVersion": "612264445",<br>"creationTimestamp": "2023-08-24T0:25",<br>"labels": {<br>"app": "calendar"<br>},<br>"annotations": {<br>"kubernetes.io/psp": "eks.privileged",<br>"zoom.us/restartedAt": "2022-09-08T0"<br>},<br>"ownerReferences": [<br>{<br>"apiVersion": "apps/v1,"<br>"kind": "ReplicaSet",<br>"controller": true,<br>"blockOwnerDeletion": true<br>}<br>]<br>}<br>} |

Figure 5D:
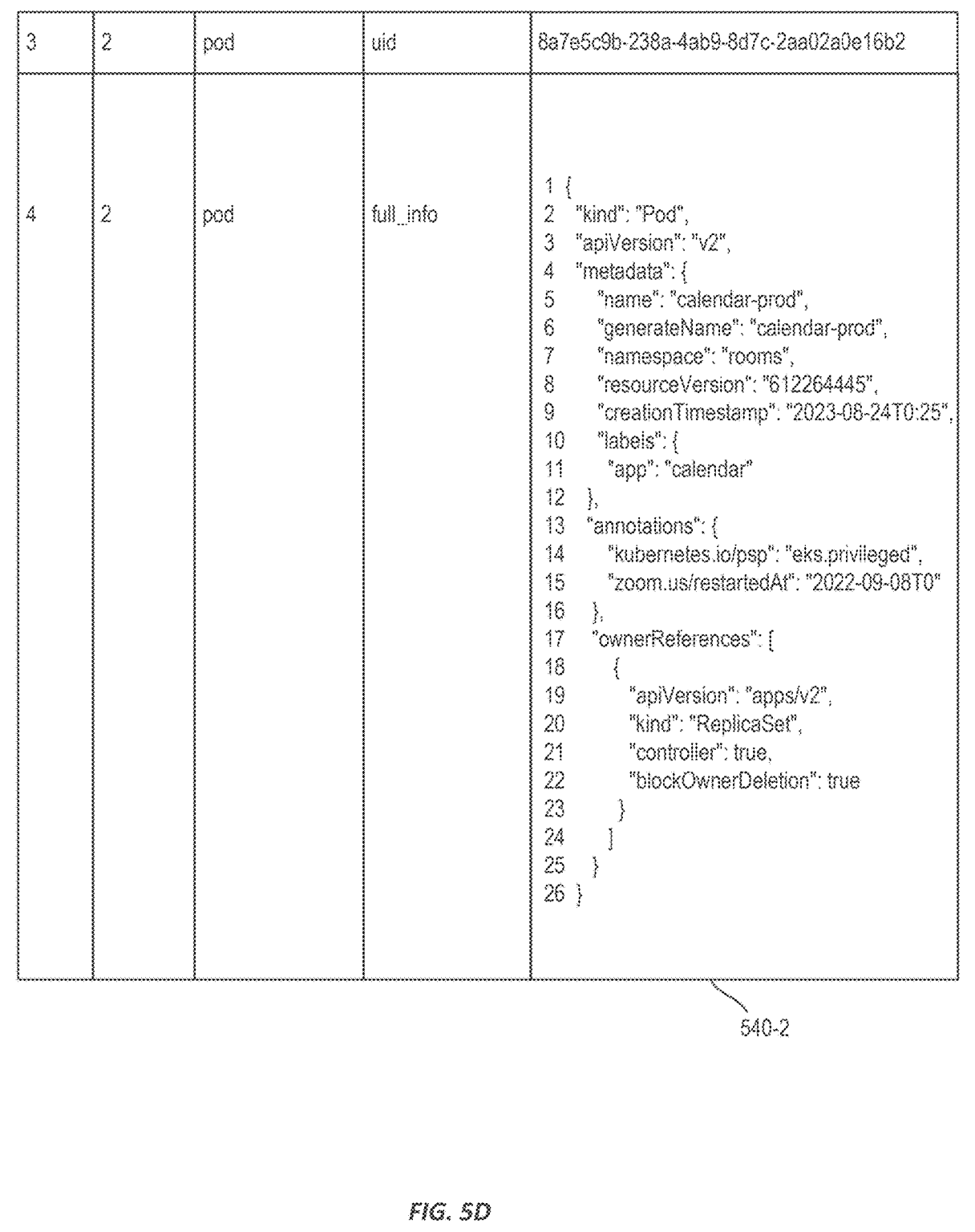

| | | | | |
|---|---|---|---|---|
| 3 | 2 | pod | uid | 8a7e5c9b-238a-4ab9-8d7c-2aa02a0e16b2 |
| 4 | 2 | pod | full_info | {<br>"kind": "Pod",<br>"apiVersion": "v2",<br>"metadata": {<br>"name": "calendar-prod",<br>"generateName": "calendar-prod",<br>"namespace": "rooms",<br>"resourceVersion": "612264445",<br>"creationTimestamp": "2023-08-24T0:25",<br>"labels": {<br>"app": "calendar"<br>},<br>"annotations": {<br>"kubernetes.io/psp": "eks.privileged",<br>"zoom.us/restartedAt": "2022-09-08T0"<br>},<br>"ownerReferences": [<br>{<br>"apiVersion": "apps/v2",<br>"kind": "ReplicaSet",<br>"controller": true,<br>"blockOwnerDeletion": true<br>}<br>]<br>}<br>} |

| Value ID 562 | Instance ID 564 | Resource Type 566 | Attribute Name 568 | Value 570 |
|---|---|---|---|---|
| 1 | 1 | pod | uid | 052c3ed3-7b63-424f-8ff1-b4e0291a4425 |
| 2 | 2 | pod | uid | 8a7e5c9b-238a-4ab9-8d7c-2aa02a0e16b2 |

```
1  SELECT sub1.inst_id
2  FROM
3      (
4      SELECT inst_id, group_id
5      FROM value_link
6      WHERE attr_name = 'address_type' AND value = 'internal'
7      ) sub1
8  JOIN
9      (
10     SELECT inst_id, group_id
11     FROM value_index
12     WHERE attr_name = 'address' and value = 'jdbc:mysql://localhost:3306/order'
13     ) sub2
14 ON sub1.inst_id = sub2.inst_id and sub1.group_id = sub2.group_id;
```

602 (lines 4–7)

604 (lines 10–13)

*FIG. 6*

ACCESS A RESOURCE MANAGEMENT DATABASE
705

DETERMINE AN ATTRIBUTE VALUE CORRESPONDING TO AN ATTRIBUTE OF A RESOURCE INSTANCE COMPRISES AN OBJECT ARRAY, WHEREIN THE OBJECT ARRAY COMPRISES A PLURALITY OF ARRAY FEATURES
710

CONVERT THE PLURALITY OF ARRAY FEATURES TO A PLURALITY OF CONVERTED ATTRIBUTES
715

UPDATE AN ATTRIBUTE TABLE BY REPLACING THE ATTRIBUTE OF THE RESOURCE INSTANCE WITH THE PLURALITY OF CONVERTED ATTRIBUTES
720

UPDATE AN VALUE TABLE BY ADDING ONE OR MORE GROUP IDENTIFICATIONS FOR GROUPING A PLURALITY OF ATTRIBUTE VALUES CORRESPONDING TO THE PLURALITY OF CONVERTED ATTRIBUTES FOR THE RESOURCE INSTANCE
725

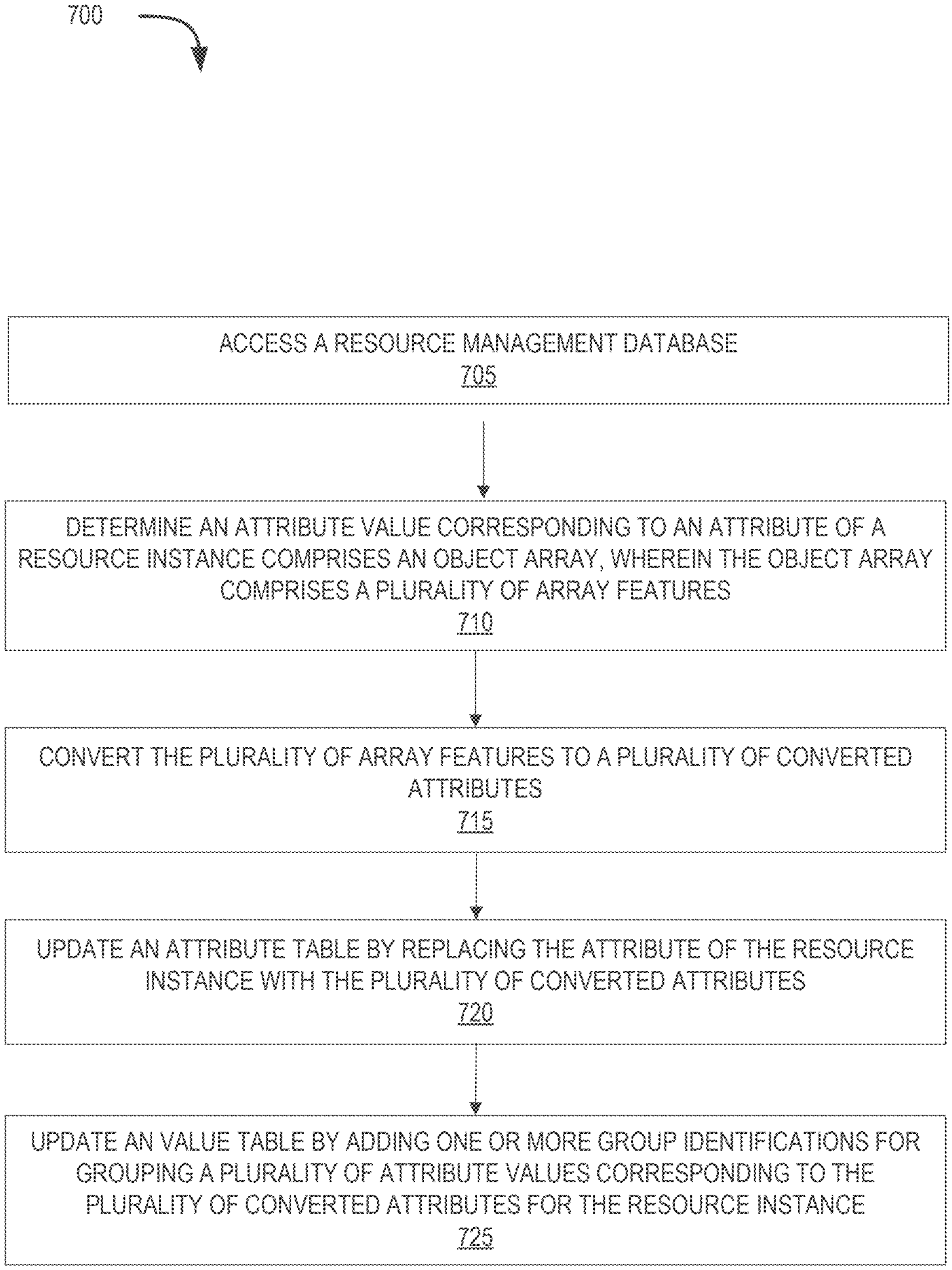

*FIG. 7*

RECEIVE A USER QUERY FOR ONE OR MORE RESOURCE INSTANCES
905

DETERMINE A TARGET ATTRIBUTE NAME AND A CORRESPONDING TARGET ATTRIBUTE VALUE BASED ON THE USER QUERY
910

DETERMINE, FROM A VALUE INDEX TABLE OF A RESOURCE MANAGEMENT DATABASE, AT LEAST ONE ATTRIBUTE VALUE MATCHING THE TARGET ATTRIBUTE NAME AND THE CORRESPONDING TARGET ATTRIBUTE VALUE
915

IDENTIFY AT LEAST ONE RESOURCE INSTANCE HAVING THE AT LEAST ONE ATTRIBUTE VALUE
920

PROVIDE INFORMATION RELATED TO THE AT LEAST ONE RESOURCE INSTANCE
925

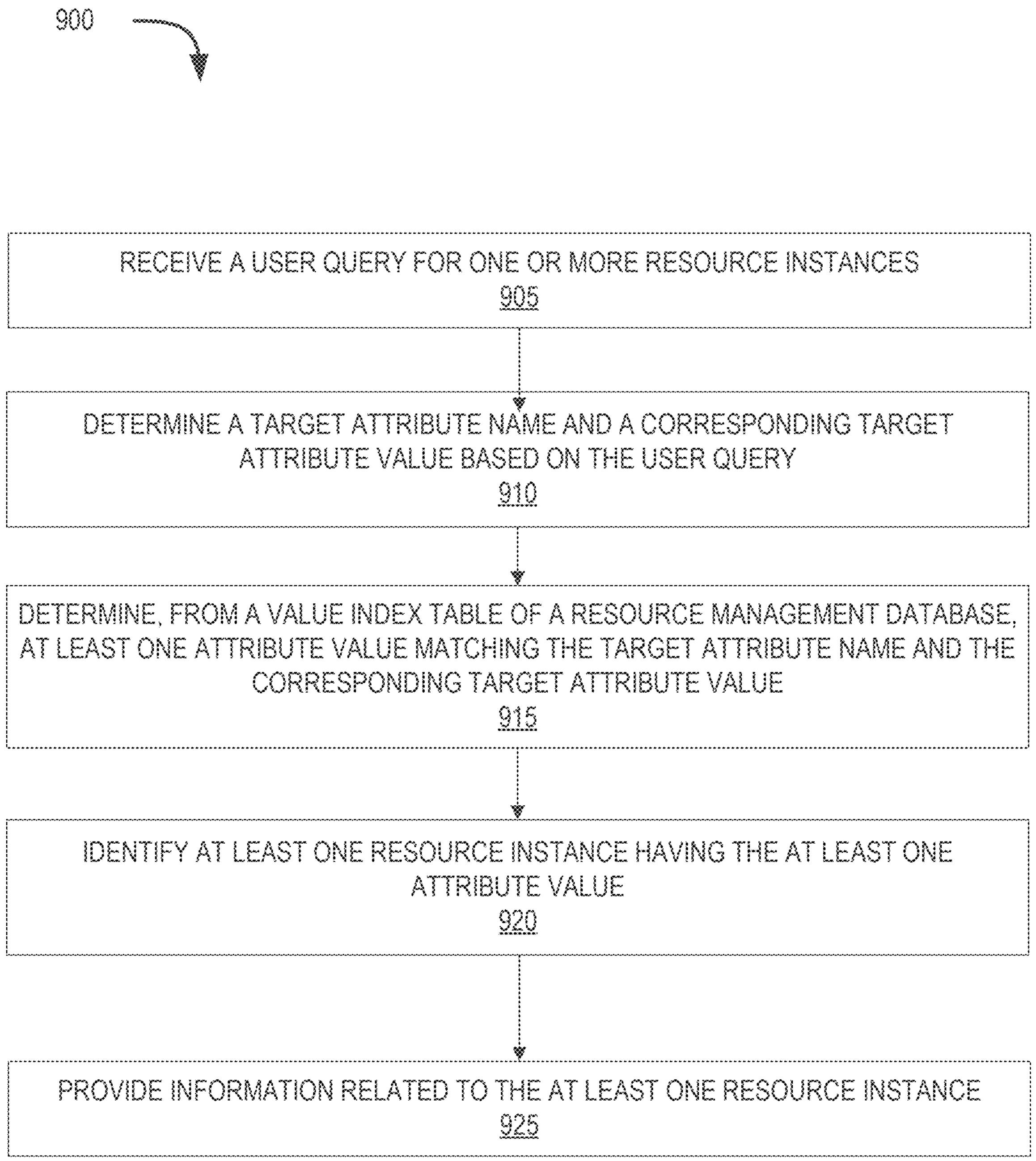

*FIG. 9*

SCALABLE DESIGN OF RELATIONAL DATABASE FOR RESOURCE MANAGEMENT

FIELD

The present application generally relates to resource management and more specifically relates to scalable design of relational database for resource management.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 4 shows example resource management tables for resource instances having attributes in an object array;

FIG. 5A shows an example data record;

FIG. 5B shows the resource table, instance table, and the attribute table for the two Kubernetes pod instances in FIG. 5A;

FIG. 5C show one part of the value table for the two Kubernetes pod instances in FIG. 5A;

FIG. 5D shows the other part of the value table for the two Kubernetes pod instances in FIG. 5A;

FIG. 5E shows a value index table for the two Kubernetes pod instances in FIG. 5A;

FIG. 6 shows an example query entry for querying instances with a specific address type value and a specific address value;

FIG. 7 shows an example process for resource management using a scalable resource management database;

FIG. 9 shows an example process for querying a resource management database for resource instances.

DETAILED DESCRIPTION

Figure 1:
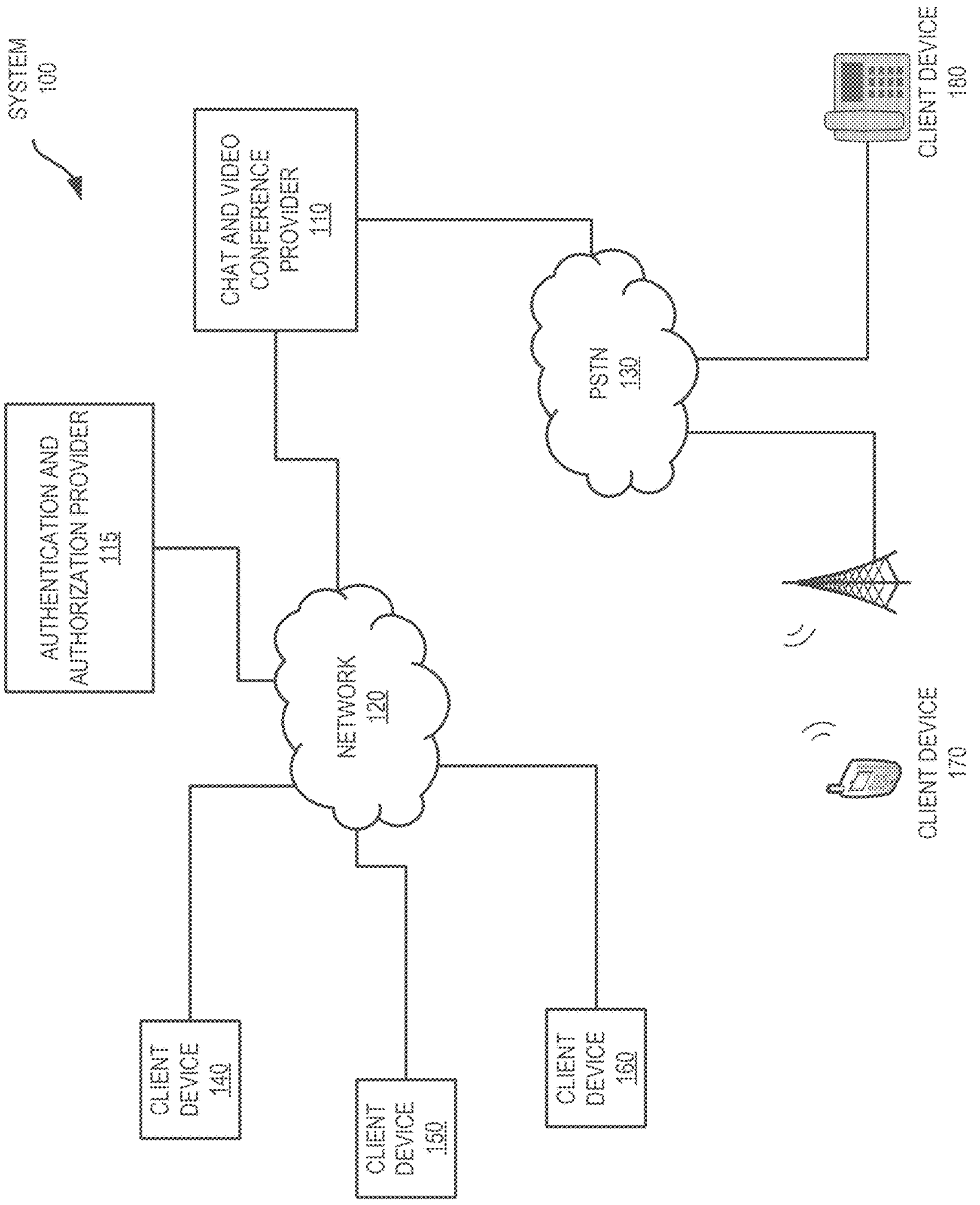
FIG. 1 shows an example system that provides chat and videoconferencing functionality to various client devices.

Examples are described herein in the context of scalable design of relational database for resource management. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

As an enterprise develops, more compute resources, such as servers, databases, and network capacity are needed. These resources can become more complex over time. To help manage these resources, a resource management system that uses a database to maintain information about these resources instances can be used. Each resource instance stored in the database can have attributes to represent the characteristics of the type of resource. For example, a MySQL database instance is a resource instance that has several attributes, such as a database instance name, addresses to use to access the database instance, and the owner of the database instance. As the enterprise develops, some new resource types may be added. For example, only a MySQL database was originally in use, but then an Oracle database was added, so the resource management system needs to support and reflect these changes. In addition, some new attributes may be added to the resource management system for existing types of resources, and so the resource management system needs to support these changes in resource type attributes. For example, a capacity attribute for the MySQL database or other databases may be added to the resource management system. Current resource management systems are not scalable for new resource types or new resource attributes. Thus, a scalable resource management system is needed to manage existing and new compute resources owned or used by the enterprise.

A resource management system can be designed to include multiple relational tables. For example, the relational tables may include a resource table storing resource type names for different types of the resources, an attribute table storing attributes of corresponding resource types, an instance table storing instances of resource types, and a value table storing different values of corresponding attributes for each resource type instance. A resource instance can be runtime object representing a resource. A resource instance can be made available to services running on the same server and shared between applications. In some examples, an attribute of a resource instance is an array of objects. For example, a MySQL instance may have multiple network addresses described in an object array, including address types and corresponding address values. When a user needs to query for a resource instance whose address type is external and corresponding address value is "jdbc:mysql://100.10.10.10:3306/order." The query may not return a matching resource instance if the user searches an attribute named "address_type" because the current attribute table does not include an attribute named "address_type". Thus, current designs of the resource management system cannot meet this query need.

To address the issue of querying resource instances based on attributes that include an array of objects, a resource management tool can store the individual objects in the array as separate attributes in the attribute table. The attribute table can then be updated to include separate object attributes. Meanwhile, the separate object attributes are also stored in the value table where they store the corresponding attribute values. In addition, a field is added in the value table to group such an attribute and its value. For example, the address attribute for MySQL is in an object array format, including an address type and an address. The address attribute can be split into two attributes, namely "address_type" and "address," to replace the original address attribute in the attribute table. A "group ID" field is added to the value table, and an "address_type" value and its corresponding "address" value are marked with the same group ID to indicate correspondence. For example, an internal address for a resource instance is "jdbc:mysql://localhost:3306/order" and an external address for the resource instance is "jdbc:mysql://100.10.10.10:3306/order." The "address_type" value "internal" and the corresponding "address" value have the same group ID "1," and the address type value "external" and the corresponding address value have the same group ID "2."

Another problem related to querying certain resource instances in the existing resource management system is that certain attribute values include a large string structure or information of a large size (e.g., 1 megabyte (MB)). For example, a Kubernetes pod ("pod") is a resource type in a Kubernetes container environment, including a group of containers for executing applications. A pod instance includes a "unique identifier" (UID) attribute and a "full information" attribute. A user frequently queries based on UID. In the current design, an index can be added for the value field to speed up the query. However, for certain attribute values of a large size, for example the full information attribute for a pod resource instance, creating an index on the value field may cause the index to be very large and very slow, or even bring down the service. Therefore, such design cannot meet the need to quickly query resources instances with certain attribute values of a large size.

Instead, a separate value index table can be added to only store attribute values that are often used for query to speed up queries. The value index table can exclude attribute values with a size greater than a size threshold or a query frequency below a frequency threshold. For example, a value index table can be added for managing pod resource instances, besides a resource table, an attribute table, an instance table, and a value table. The value table includes values for the UID attributes and full information attributes. Since querying pod resource instances are usually based on UID values, the value index table can only include the UID values, and the full information values can be excluded from the value index table.

Thus, the present disclosure provides a scalable design of a resource management system in a relational database, which provides modifiable relational tables or can add new relational tables to accommodate different resource instances. The scalable design of the resource management system can effectively facilitate querying resource instances.

This illustrative example is given to introduce the reader to the general subject matter discussed herein and the disclosure is not limited to this example. The following sections describe various additional non-limiting examples and examples of scalable design of relational database for resource management.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
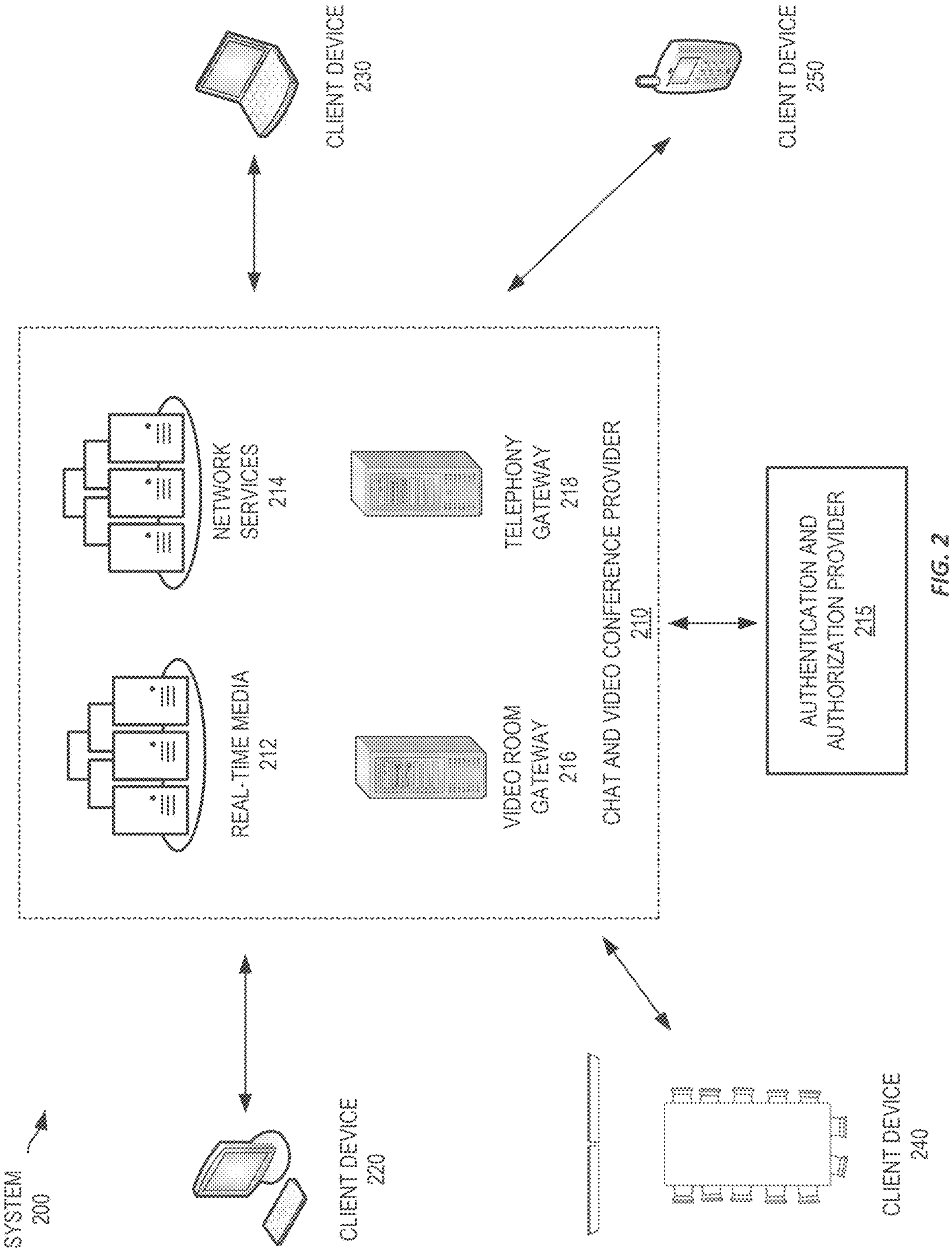
FIG. 2 shows an example system in which a chat and video conference provider provides chat and videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O) as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
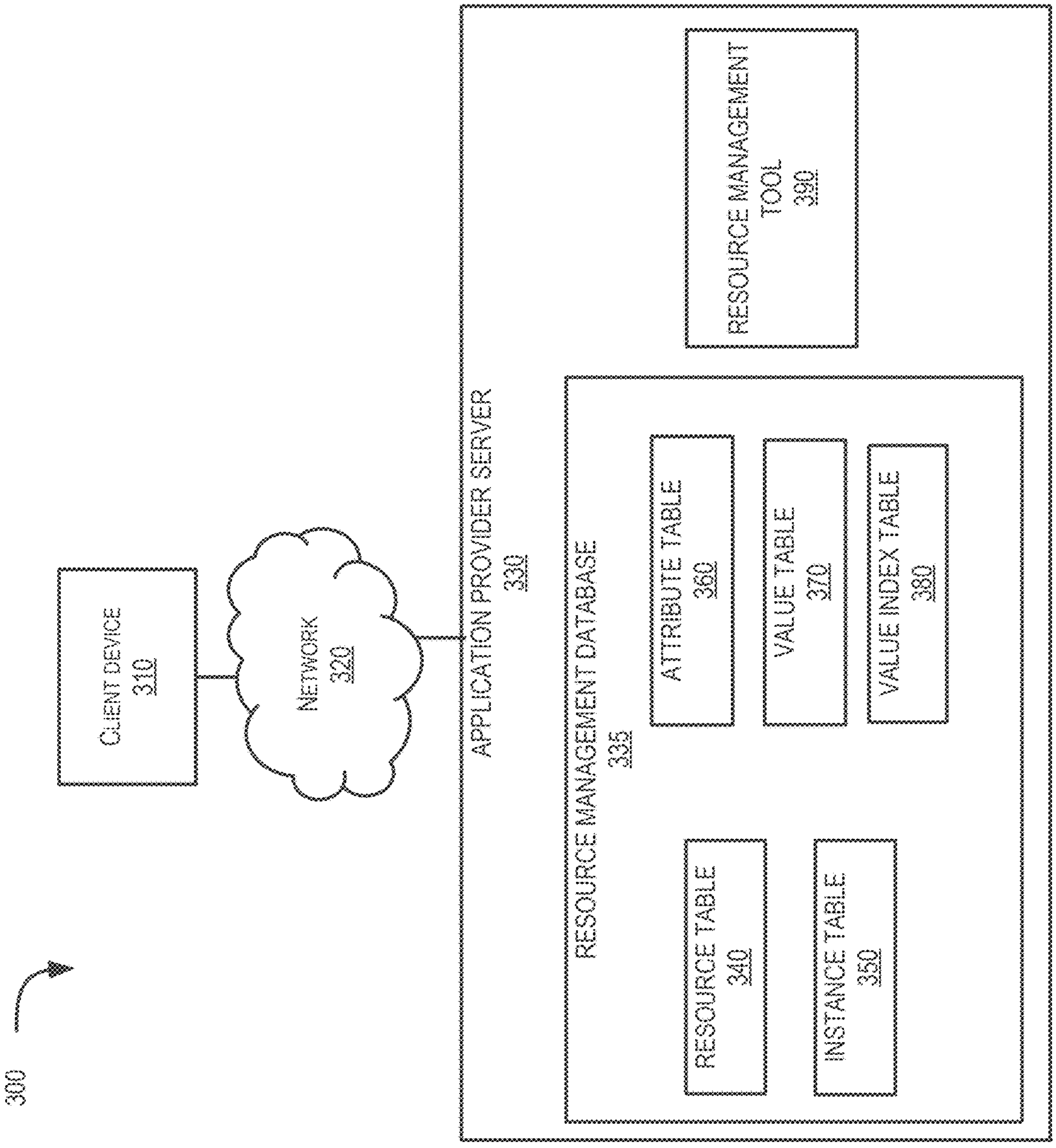
FIG. 3 shows an example system for resource management.

Referring now to FIG. 3, FIG. 3 shows an example system 300 for resource management. In this example system 300, a client device 310 is in communication with an application provider server 330 via network 320. In this example, the network 320 is the internet, however, any suitable communications network or combination of communications network may be employed, including LANs (e.g., within a corporate private LAN) and WANs, similar to the network 120 illustrated in FIG. 1. The application provider server 330 can be the chat and video conference provider 110 illustrated in FIG. 1 or the chat and video conference provider 210 illustrated in FIG. 2. However, the application provider server 330 is not limited to providing chat and video conferencing functionalities only. Alternatively, or additionally, the application provider server 330 can be one or more servers for other suitable enterprises that own or use compute resources for providing products or services.

In this example, the application provider server 330 includes a resource management database 335. The resource management database 335 can be a relational database configured to store and organize data related to various compute resources instances. The resource management database 335 can include a resource table 340, an instance table 350, an attribute table 360, a value table 370, and a value index table 380.

The application provider server 330 includes a resource management tool 390. The resource management tool 390 can update the resource management database 335 to include new resource types, new instances, new attributes, or new attribute values. Thus, the resource management database 335 is designed to scale. Meanwhile, the resource management tool 390 or another tool can facilitate querying resource instances stored in the resource management database 335. The resource management tool 390 can be a software module on the application provider server 330. For example, the resource management tool 390 is created as a command line program in the execution environment on the application provider server 330. The resource management tool 390 can be specific to an execution environment. Alternatively, the resource management tool 390 can be adaptable to more than one environment.

The resource table 340 is configured to record various available resource types. The resource table 340 can include an ID field to number the various resource types and a type field to store the various resource types. The instance table 350 is configured to record instances of various resource types. The instance table 350 can include an ID field to number the various resource instances and a resource type field to store the resource type names for corresponding instances. The attribute table 360 is configured to record attributes of different resource types. The attribute table 360 can include an ID field to number the various attributes, a resource type field to identify corresponding resource type names, and an attribute name field to store various attribute names. The value table 370 is configured to record attribute values for various resource instances. The value table 370 can include an ID field to number the various attribute values, an instance ID field to store the corresponding instances, a resource type field to store the corresponding resource type names, an attribute name field to store attributes for corresponding resource instances, and a value field to store the values for corresponding attributes.

The resource management tool 390 can create a value index table 380 based on the value table 370. However, in this example, the value index table only stores attribute values that satisfy a size threshold and a query frequency threshold. For example, if a size of an attribute value is greater than the size threshold and the frequency of the attribute value being used in a query is less than the query frequency threshold, the attribute value is excluded from the value index table 380.

In some examples, an attribute value corresponding to an attribute of a resource instance is an object array, which includes multiple array features. For example, an address value for a MYSQL database instance is an object array, including multiple sets of addresses. The multiple array features can include an address type feature and an address feature. To store information about the MYSQL database instance in the resource management database 335, the address type feature and the address feature in the object array of the address value can be converted to two attributes, namely the "address_type" attribute and the "address" attribute. Thus, the original address attribute is replaced with the "address_type" attribute and the "address" attribute. Accordingly, the value table can be updated to store the corresponding attribute values and include a group identification field to group an address type value and a corresponding address value. FIG. 4 illustrates example resource management tables for resource instances having attributes in an object array, as described below.

In some examples, an attribute value has a large size, for example hundreds of kilobytes (KB) or megabytes (MB), yet the attribute value is not used for query frequently, for example less than 100 queries per second (QPS). When a user queries the value table 370 for other attribute values, the query can be slow due to the large size of some attribute values. Thus, the resource management tool 390 can create a separate value index table 380 to only index attribute values with a size equal to or less than a size threshold (e.g., 64 KB) and with a query frequency equal to or above a query frequency threshold (e.g., 100 QPS). In some cases, the size of the index attribute value and the query frequency threshold may be inversely related. For example, an index attribute value having a size of 100 KB may have a query frequency threshold of 100 QPS, while an index attribute value having a size of 500 KB may have a query frequency threshold of 1000 QPS. Thus, the larger the size of an index attribute value, the more likely it can be excluded from the value index table 380. FIG. 5 illustrates example resource management tables for resource instances with attribute values of a large size, as described below.

Referring now to FIG. 4, FIG. 4 shows example resource management tables for resource instances having attributes in an object array. Data record 405 shows two MYSQL database instances, including corresponding names, addresses, owners, and capacities. Resource table 410 includes resource type ID field 412 and a resource type name field 414. It can be seen there are two resource types available, namely MYSQL and Oracle. Instance table 420 includes an instance ID field 422 and a resource type field 424. In FIG. 4, the two instances in data record 405 are both MYSQL database instances, so there is one resource type stored in the instance table 420 for two instances in the instance table 420. Attribute table 430 includes an attribute ID field 432, a resource type field 434, and an attribute name field 436. As shown in data record 405, the address for each MYSQL database instance is in an object array, including two array features, namely an address type and a corresponding address. Specially for instances in data record 405 in this example, there are two sets of addresses, an internal address and an external address. Thus, these two array features can be stored as separate attributes. The example attribute table 430 includes four attributes: instance name, address type, address, and owner.

Value table 440 includes a value ID field 442, an instance ID field 444, a resource type field 446, an attribute name field 448, a value field 450, and a group ID field 452. As can be seen in value table 440, the values for "address_type" attribute and the "address" attribute are stored separately for each instance. In addition, value "internal" and value "jdbc:mysql://localhost:3306/order" are grouped together as group 1, indicating these two values correspond to each other for instance 1. Value "external" and value "jdbc:mysql://100.10.10.10:3306/order" are grouped together as group 2, indicating these two values correspond to each other for instance 2. Similarly, value "internal" and value "jdbc:mysql://localhost:3306/user" are grouped together as group 1, indicating these two values correspond to each other for instance 2. Value "external" and value "jdbc:mysql://100.10.10.10:3306/user" are grouped together as group 2, indicating these two values correspond to each other for instance 2. Thus, each attribute value can be uniquely stored in value table 440.

In addition, a value index table can index the attribute values and exclude certain attribute values with a size greater than a size threshold and with a query frequency less than a query frequency threshold. In this example, the attribute values in value table 440 can all be included in the value index table because all their sizes are equal to or less than the size threshold and all their query frequences are equal to or greater than the query frequency threshold. Thus, the value index table for the two instances in FIG. 4 is the same as the value table 440, and not shown in FIG. 4. In contrast, FIG. 5 as described below shows a value index table that excludes certain attribute values from the value table.

Referring now to FIG. 5, FIG. 5 shows example resource management tables for resource instances having attribute values greater than a size threshold and a query frequency less than a query frequency threshold.

FIG. 5A shows an example data record 505. Data record 505 includes information about two Kubernetes pod instances, for example corresponding UIDs and full information. It can be seen that the full information for each Kubernetes pod instance has a large size, especially compared to the UID.

FIG. 5B shows the resource table 510, instance table 520, and the attribute table 530 for the two Kubernetes pod instances in FIG. 5A. Similar to resource table 410 in FIG. 4, resource table 510 includes a resource type ID field 512 and a resource type name field 514. Similar to instance table 420 in FIG. 4, instance table 520 includes an instance ID field 522 and a resource type field 524. Similar to attribute table 430 in FIG. 4, attribute table 530 includes an attribute ID field 532, a resource type field 534, and an attribute name field 536.

FIG. 5C show one part of the value table 540-1 for the two Kubernetes pod instances in FIG. 5A. FIG. 5D shows the other part of the value table 540-2 for the two Kubernetes pod instances in FIG. 5A. Value table 540-1 and value table 540-2 combined together is the complete value table 540 for the two Kubernetes pod instances in FIG. 5A. Similar to value table 440 in FIG. 4, value table 540 includes a value ID field 542, an instance ID field 544, a resource type field 546, an attribute name field 548, and a value field 550. The value field 550 can also include a group ID field. However, the attributes for the Kubernetes node instances do not have object arrays or derived from attributes in object arrays, and the group IDs may be void. Thus, the group ID field is now shown.

FIG. 5E shows a value index table 560 for the two Kubernetes pod instances in FIG. 5A. The values for the full information attribute as shown in the value table 540 in FIGS. 5C and 5D are of a large size, for example greater than a predetermined size threshold of 64 KB. Meanwhile, the full information values are not generally used in queries, and the query frequency is low, for example less than a predetermined query frequency threshold of 50 QPS. Thus, the resource management tool 390 can create a value index table 560 as shown in FIG. 5E based on the value table 540 in FIGS. 5C and 5D. The values of the full information attribute value in the value table 540 can be excluded from the value index table 560. As shown in FIG. 5E, the value index table 560 is similar to the value table 540, including a value ID field 562, an instance ID field 564, a resource type field 566, an attribute name field 568, and a value field 570. However, the attribute names field 568 only includes the UID attribute and does not include the full information attribute. Correspondingly, the value field 570 only include UID values and does not include the full information attribute values for the two Kubernetes pod instances.

Referring now to FIG. 6, FIG. 6 shows an example query entry for querying instances with a specific "address_type" value and a specific "address" value. In FIG. 6, section 602 is querying instances with an "addresses type" attribute and a corresponding "internal" attribute value. section 604 is query instances with an address attribute and a corresponding attribute value of "jdbc:mysql://100.10.10.10:3306/order." It can be noted that the value index table is used for query as shown in both section 602 and section 604.

Referring now to FIG. 7, FIG. 7 shows an example process 700 for resource management using a scalable resource management database. The example method 700 will be discussed with respect to the system 300 shown in FIG. 3; however, any suitable system for resource management using scalable resource management database may be used.

At block 705, a resource management tool 390 accesses a resource management database 335. In this example, the resource management database includes a resource table 340, an instance table 350, an attribute table 360, and a value table 370. The resource table 340 can store the names of resource types available on the application provider server 330. Examples of various resource types include different types of servers, different types of databases (e.g., MYSQL or Oracle), and different types of network connections. The instance table 350 can store resource instances on the application provider server 330. A resource instance can be runtime object representing a resource. A resource instance instantiates the configuration defined in a resource template, can be made available to services running on the application provider server 330, and can be shared between applications. The attribute table 360 can store various attributes of corresponding resource instances. The value table 370 can store attribute values for corresponding resource instances.

At block 710, the resource management tool 390 determines an attribute value corresponding to an attribute of a resource instance comprises an object array. The resource instance can be an existing resource instance already recorded in the resource management system. Alternatively, or additionally, the resource instance is a new resource instance. The resource management tool 390 can determine an attribute value corresponding to an attribute of a resource instance is in an object array format. The object array can include a plurality of array features (or properties). For example, an address of a MYSQL database instance having an array that includes an "address_type" feature and an "address" feature; however, an array may store any number of properties. In this example, the "address type feature" can be "internal" or "external," while the "address" feature can be an internal network address or an external network address.

At block 715, the resource management tool 390 converts the plurality of array features to a plurality of converted resource attributes. Following the example at block 710, the resource management tool 390 can convert the two array features—the "address_type" feature and the "address" feature—into two separate attributes. Thus, the original address attribute for the MYSQL database instance is converted into an "address_type" attribute and an "address" attribute.

At block 720, the resource management tool 390 updates a attribute table 360 by adding the plurality of converted attributes for the resource instance. In some examples, the resource instance is already recorded in the resource management database 335 with one attribute stored in the attribute table 360 whose corresponding value is an array. The resource management tool 390 can replace the one array attribute with a plurality of converted attributes, as described at block 720. In some examples, the resource instance is new and has not been recorded in the resource management database 335 yet. The resource management tool 390 then can add the plurality of converted attributes, as described at block 715, to the attribute table 360. Following the example at block 715, the two converted attributes—the "address_type" attribute and the address attribute—are added to the attribute table 360 for the resource instance.

At block 725, the resource management tool 390 updates a value table 370 by adding one or more group identifications for grouping a plurality of attribute values corresponding to the plurality of converted attributes for the resource instance. The value table 370 includes attribute names and corresponding values. When converted attributes from an object array are stored in the attribute table and in turn the value table, the resource management tool 390 link the values corresponding to the converted attributes together with a group identification to indicate correspondence. Following the example at block 720, the value of the converted attribute—"address_type" attribute—can be "internal" and the value of the corresponding converted attribute—address attribute—can be "jdbc:mysql://localhost:3306/order." These two attribute values can be grouped together with a group ID "1" to indicate that these two attribute values is in one group to indicate that the internal address for the resource instance is "jdbc:mysql://localhost:3306/order." Similarly, the value of the "address_type" attribute can also be "external" and the value of the corresponding address attribute is "jdbc:mysql://100.10.10.10:3306/order." These two values can be grouped together with a group ID "2" to indicate that the external address for the resource instance is "jdbc:mysql://100.10.10.10:3306/order."

In some examples, new resources can be added to the application provider server 330. For example, only MYSQL databases were available to the application provider server 330 originally. Then an Oracle database is made available to the application provider server 330. When a new resource is made available, resource instances can be created and shared to provide services on the application provider server 330. The resource management tool 390 can update the resource table 340 to record the information about the new resource and its instances. A resource type or its corresponding instance can include one or more attributes. For example, a MYSQL database instance can include a name of the instance, an address of the instance, an owner of the instance. In some examples, new attributes can also be added to existing resource instances. For example, a capacity attribute can be added to an MYSQL database instance. When a new resource instance is created or identified, the resource management tool 390 can update the instance table 350. When new attributes are added, the resource management tool 390 can update the attribute table 360.

In some examples, the resource management tool 390 or another tool on the application provider server 330 can also query the resource management database for certain resource instances. If certain information about the resource instance in an object array format, the array features can be converted to separate attributes and corresponding values are stored as separate attribute values, as described at blocks 715, 720, and 725. The resource management tool 390 can search the separate attribute values in the value table 370.

Figure 8:
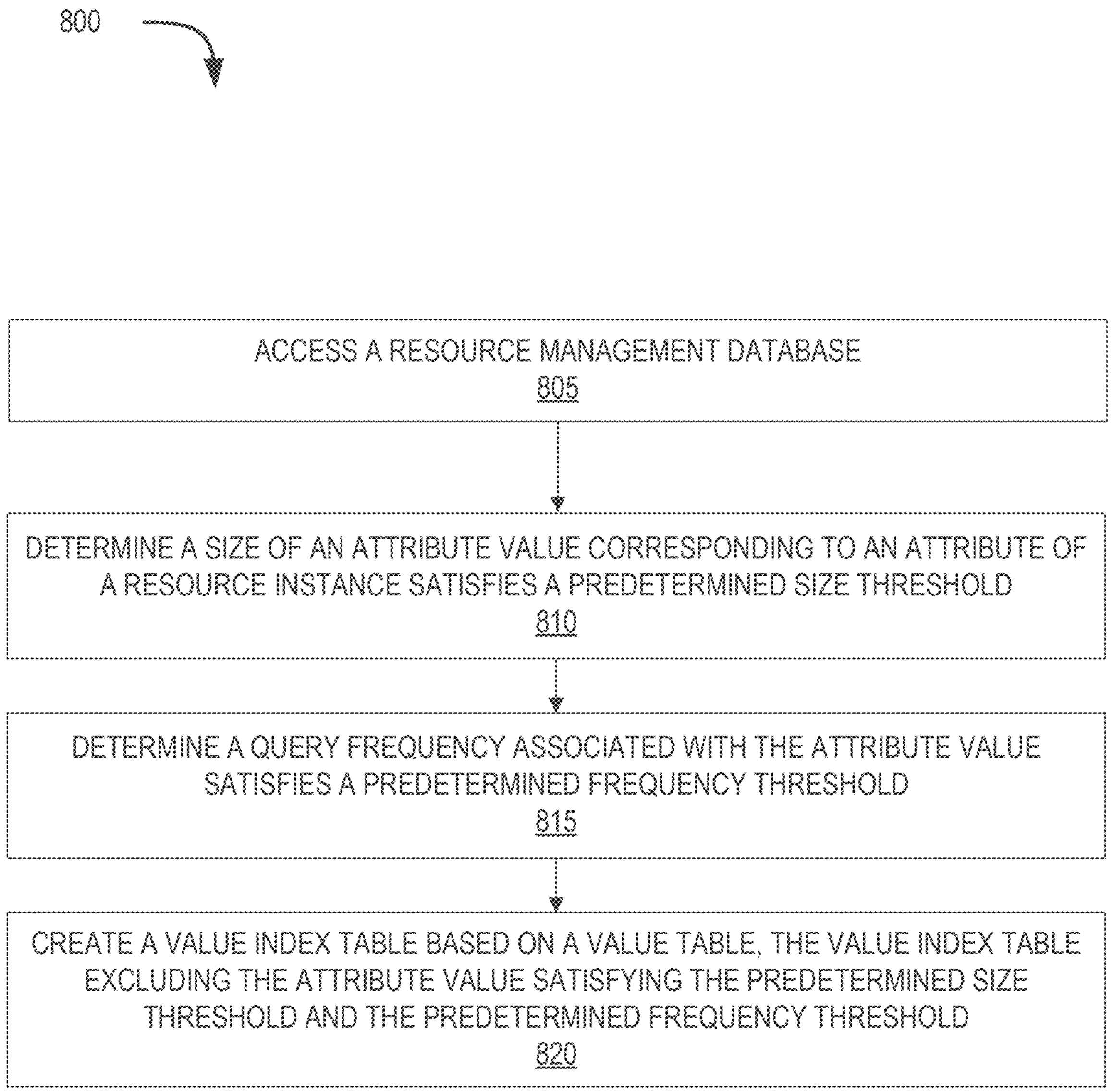
FIG. 8 shows another example process for resource management using a scalable resource management database.

Referring now to FIG. 8, FIG. 8 shows another example process 800 for resource management using a scalable resource management database. The example method 800 will be discussed with respect to the system 300 shown in FIG. 3; however, any suitable system for resource management using scalable resource management database may be used.

At block 805, a resource management tool 390 accesses a resource management database 335, comprising a resource table 340, an instance table 350, an attribute table 360, and a value table 370. Block 805 is similar to block 705 as described in FIG. 7.

At block 810, the resource management tool 390 determines a size of an attribute value corresponding to an attribute of a resource instance satisfies a predetermined size threshold. In some examples, the resource instance has already stored in the resource management database 335. In some examples, the resource management tool 390 receives or accesses information related to a new resource instance that needs to be stored in the resource management database 335. The resource management tool 390 or an operator of the application provider server 330 can predefine a size threshold for attribute values, for example 64 KB. Attribute values that are greater than the size threshold is considered as large, which may be excluded from a value index table 380 to be created at block 825. The resource management tool 390 compares the size of an attribute value to the predetermined size threshold to determine if the size of the attribute value is greater than the threshold. For example, the resource instance is a Kubernetes pod instance includes an UID attribute and a full information attribute. The value of the full information attribute is in a JSON string structure, which can be hundreds of KB or even 1 MB. The resource management tool 390 can determine the value of the full information attribute for the Kubernetes pod instance satisfies the size threshold to be excluded from the value index table 380, if the size of the full information attribute value is greater than the size threshold.

At block 815, the resource management tool 390 determines a query frequency associated with the attribute value satisfies a predetermined frequency threshold. The resource management tool 390 or an operator of the application provider server 330 can predefine a query frequency threshold for attribute values, for example 100 QPS. Attribute values that are queried less than the query frequency threshold can be considered as infrequently queried, which can be excluded from a value index table 380, which will be created at block 825. The resource management tool 390 compares the QPS of an attribute value to the predetermined query frequency threshold to determine if the QPS of the attribute value is less than the query frequency threshold. For example, the full information attribute value for the Kubernetes pod instance has a QPS of about 50. The resource management tool 390 can determine the value of the full information attribute for the Kubernetes pod instance satisfies the size threshold to be excluded from the value index table 380, if the size of the full information attribute value is less than the query frequency threshold.

At block 820, the resource management tool 390 creates a value index table 380 based on a value table 370 by excluding the attribute value satisfying the predetermined size threshold and the predetermined frequency threshold. In response to identifying an attribute value satisfying the size threshold and the query frequency threshold as described at block 810 and block 815, the resource management tool 390 can create a value index table 380 based on the value table 370 by excluding the identified attribute value. Following the example at block 815, the full information attribute value of the Kubernetes pod instance satisfies the two thresholds, thus it is excluded from the value index table 380. In some examples, the resource management tool 390 or another tool on the application provider server 330 can query the value index table for certain resource instances based on certain attribute values.

Referring now to FIG. 9, FIG. 9 shows an example process 900 for querying a resource management database for resource instances. The example method 900 will be discussed with respect to the system 300 shown in FIG. 3; however, any suitable system for resource management with a scalable resource management database may be used.

At block 905, a resource management tool 390 receives a user query for one or more resource instances. An example query entry is illustrated in FIG. 6. A user can specify certain information related to the resource instances of interest, such as one or more attribute names and corresponding attribute values, the user query.

At block 910, the resource management tool 390 determines a target attribute name and a corresponding target attribute value based on the user query. In some examples, the attributes specified in the user query are some attributes converted from an object array related to a resource instance. Therefore, two attribute names and corresponding attribute values may need to be provided in one user query in order to identify a resource instance. For example, the attribute "address" for a resource instance in data record 405 has a corresponding value in an object array format, and two attributes, such as "address_type" and "address" as shown in tables 430 and 440, were converted from the object array. Thus, in FIG. 6, a first target attribute name "address_type" and corresponding value "internal" and a second target attribute name "address" and corresponding value "jdbc:mysql://localhost:3306/order" are specified in the user query. In another example, the attribute names in the user query are not converted from an object array, but it is a regular attribute name. For example, a target attribute name is "UID" and a corresponding target attribute value is "052c3ed3-7b63-424f-8ff1-b4e0291a4425."

At block 915, the resource management tool 390 determines, from a value index table 380 of a resource management database 335, at least one attribute value matching the target attribute name and the corresponding target attribute value. The value index table 380 is created generally as described at block 820 in FIG. 8. The value index table 380 includes indexed attribute values that are frequently queried and within a size threshold, corresponding attribute names, instance IDs, and resource types. The resource management tool 390 compares the target attribute name with the attribute names in the value index table 380, and compares the identified target attribute value with the values in the value index table 380 to identify an attribute value matching the target attribute name and the target attribute value. In some examples, the resource management tool 390 does not identify any match in the value index table 380. The resource management tool 390 can continue to search in the value table 370, because the value index table 380 may have excluded some attribute values that are less frequently queried or have a larger size.

At block 920, the resource management tool 390 identifies at least one resource instance having the at least one attribute value. If at least one attribute value is identified to match the target attribute name and the target attribute value, the resource management tool 390 obtains the corresponding at least one instance identification from the value index table 380 or the value table 370. If one or more target attribute names are converted from an object array, the resource management tool 390 also determines if the corresponding attribute values are labeled with the same group ID in order to determine if corresponding attribute values are for one resource instance. For example, the resource management tool 390 determines that attribute value "internal" and attribute value "jdbc:mysql://localhost:3306/order" are labeled with the same group ID "1." Thus, the resource management tool 390 determines the instance identification corresponding to the two attribute values, as shown in table 440 of FIG. 4.

At block 925, the resource management tool 390 provides information related to at least one resource instance. Information related to a resource instance includes a resource type, an instance owner, and other attributes of the resource instance and corresponding attribute values. Such information can be retrieved from other tables in the resource management database 335, for example instance table 350, attribute table 360, and value table 370, based on the instance identification.

The example methods 700, 800, and 900 illustrates methods for resource management with a scalable resource management database and querying such a resource management database for resource instances. However, not every step in the example methods may be needed, or some steps may be in a different order. The example methods performed by the application provider server 330. Alternatively, the example methods can be performed by a client device 310.

Figure 10:
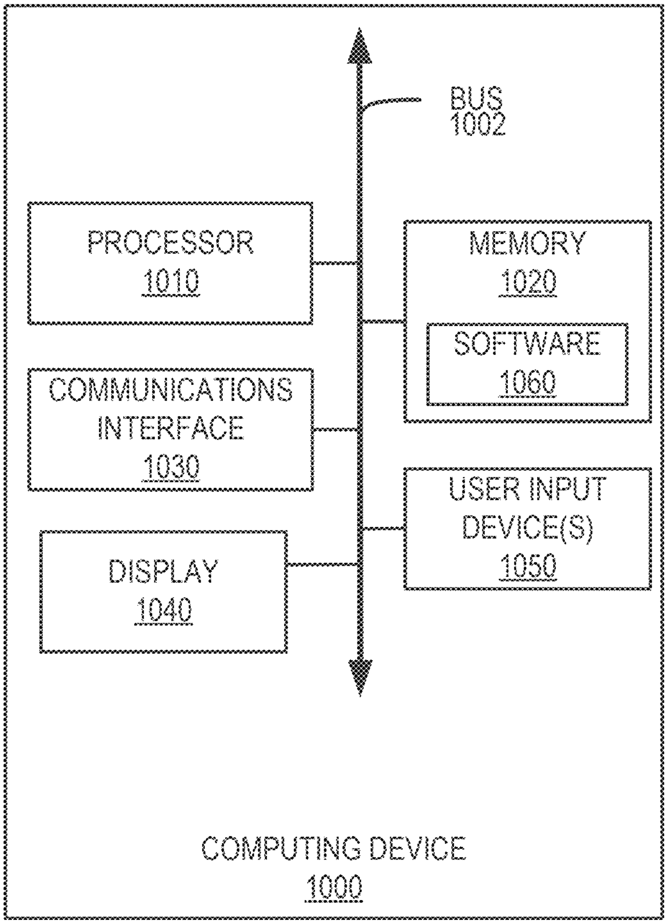
FIG. 10 shows an example computing device suitable for use with example systems and methods for resource management.

Referring now to FIG. 10, FIG. 10 shows an example computing device 1000 suitable for use in example systems or methods for resource management using scalable resource management database. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for resource management according to different examples, such as part or all of the example method 700 described above with respect to FIG. 7, example method 800 with respect to FIG. 8, and example method 900 with respect to FIG. 9. In some embodiments, the computing device may include software 1060 for executing one or more methods described herein, such as for example, one or more steps of methods 700, 800, and 900. The computing device 1000, in this example, also includes one or more user input devices 1050, such as a keyboard, mouse, touchscreen, microphone, etc., to accept user input. The computing device 1000 also includes a display 1040 to provide visual output to a user.

The computing device 1000 also includes a communications interface 730. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

accessing a resource management database, the resource management database comprising a value table storing one or more attribute values corresponding to one or more attributes for one or more resource instances, the one or more resources instance comprising one or more runtime objects representing one or more compute resources;

determining that a size of an attribute value corresponding to an attribute of a resource instance is greater than a predetermined size threshold;

determining that a query frequency associated with the attribute value of the resource instance is less than a predetermined query frequency threshold; and creating a value index table based on the value table, the value index table excluding the attribute value of the resource instance.

2. The method of claim 1, further comprising:

updating the resource management database by adding the value index table.

3. The method of claim 1, further comprising:

querying resource instances based on the value index table.

4. The method of claim 1, wherein the resource management database further comprises a resource table, an instance table, and an attribute table, wherein the resource table is configured to record one or more resource types, wherein the instance table is configured to store the one or more resource instances corresponding to the one or more resource types, wherein the attribute table is configured to store the one or more attributes for the one or more resource instances.

5. The method of claim 1, wherein the resource instance is a Kubernetes pod instance, attributes for the Kubernetes pod instance comprises a unique identification attribute and a full information attribute, and wherein a value of the full information attribute for the Kubernetes pod instance is in a JSON string structure.

6. The method of claim 5, further comprising:

determining the size of the value of the full information attribute for the Kubernetes pod instance is greater than the predetermined size threshold;

determining the query frequency associated with the value of the full information attribute for the Kubernetes pod instance is less than the predetermined query frequency threshold; and creating the value index table based on the value table, the value index table excluding the value of the full information attribute for the Kubernetes pod instance.

7. The method of claim 1, wherein the predetermined size threshold is 64 kilobytes, and wherein the predetermined query frequency threshold is 50 queries per second.

8. A system comprising:

a communications interface;

a non-transitory computer-readable medium; and one or more processors communicatively coupled to the communications interface and the non-transitory computer-readable medium, the one or more processors configured to execute processor-executable instructions stored in the non-transitory computer-readable medium to:

access a resource management database, the resource management database comprising a value table storing one or more attribute values corresponding to one or more attributes for one or more resource instances, the one or more resources instance comprising one or more runtime objects representing one or more compute resources;

determine that a size of an attribute value corresponding to an attribute of a resource instance is greater than a predetermined size threshold;

determine that a query frequency associated with the attribute value of the resource instance is less than a predetermined query frequency threshold; and create a value index table based on the value table, the value index table excluding the attribute value of the resource instance.

9. The system of claim 8, wherein the one or more processors are configured to execute further processor-executable instructions stored in the non-transitory computer-readable medium to:

update the resource management database by adding the value index table.

10. The system of claim 8, wherein the one or more processors are configured to execute further processor-executable instructions stored in the non-transitory computer-readable medium to:

query resource instance based on the value index table.

11. The system of claim 8, wherein the resource management database comprises a resource table, an instance table, and an attribute table, wherein the resource table is configured to record one or more resource types, wherein the instance table is configured to store one or more resource instances corresponding to the one or more resource types, and wherein the attribute table is configured to store one or more attributes for the one or more resource instances.

12. The system of claim 8, wherein the resource instance is a Kubernetes pod instance, attributes for the Kubernetes pod instance comprises a unique identification attribute and a full information attribute, and wherein a value of the full information attribute for the Kubernetes pod instance is in a JSON string structure.

13. The system of claim 12, wherein the one or more processors are configured to execute further processor-executable instructions stored in the non-transitory computer-readable medium to:

determine the size of the value of the full information attribute for the Kubernetes pod instance is greater than the predetermined size threshold;

determine the query frequency associated with the value of the full information attribute for the Kubernetes pod instance is less than the predetermined query frequency threshold; and create the value index table based on the value table, the value index table excluding the value of the full information attribute for the Kubernetes pod instance.

14. The system of claim 8, wherein the predetermined size threshold is 64 kilobytes, and wherein the predetermined query frequency threshold is 50 queries per second.

15. A non-transitory computer-readable medium comprising processor-executable instructions configured to cause one or more processors to:

access a resource management database, the resource management database comprising a value table storing one or more attribute values corresponding to one or more attributes for one or more resource instances, the one or more resources instance comprising one or more runtime objects representing one or more compute resources;

determine that a size of an attribute value corresponding to an attribute of a resource instance is greater than a predetermined size threshold;

determine that a query frequency associated with the attribute value of the resource instance is less than a predetermined query frequency threshold; and create a value index table based on the value table, the value index table excluding the attribute value of the resource instance.

16. The non-transitory computer-readable medium of claim 15, further comprising processor-executable instructions configured to cause one or more processors to:

update the resource management database by adding the value index table.

17. The non-transitory computer-readable medium of claim 15, further comprising processor-executable instructions configured to cause one or more processors to:

query the value index table for the resource instance.

18. The non-transitory computer-readable medium of claim 15, wherein the resource management database comprises a resource table, an instance table, and an attribute table, wherein the resource table is configured to record one or more resource types, wherein the instance table is configured to store one or more resource instances corresponding to the one or more resource types, and wherein the attribute table is configured to store one or more attributes for the one or more resource instances.

19. The non-transitory computer-readable medium of claim 15, wherein the resource instance is a Kubernetes pod instance, attributes for the Kubernetes pod instance comprises a unique identification attribute and a full information attribute, and wherein a value of the full information attribute for the Kubernetes pod instance is in a JSON string structure.

20. The non-transitory computer-readable medium of claim 19, further comprising processor-executable instructions configured to cause one or more processors to:

determine the size of the value of the full information attribute for the Kubernetes pod instance is greater than the predetermined size threshold;

determine the query frequency associated with the value of the full information attribute for the Kubernetes pod instance is less than the predetermined query frequency threshold; and create the value index table based on the value table, the value index table excluding the value of the full information attribute for the Kubernetes pod instance.

* * * * *